(12) United States Patent
Malmborg et al.

(10) Patent No.: US 10,641,098 B2
(45) Date of Patent: May 5, 2020

(54) GAS TURBINE ENGINE HOLLOW FAN BLADE RIB ORIENTATION

(71) Applicant: United Technologies Corporation, Farmington, CT (US)

(72) Inventors: Eric W. Malmborg, Amston, CT (US); Michael A. Weisse, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 385 days.

(21) Appl. No.: 15/649,904

(22) Filed: Jul. 14, 2017

(65) Prior Publication Data

US 2019/0017386 A1   Jan. 17, 2019

(51) Int. Cl.
*F01D 5/14* (2006.01)
*F02K 3/06* (2006.01)
(Continued)

(52) U.S. Cl.
CPC .............. *F01D 5/147* (2013.01); *F01D 5/16* (2013.01); *F01D 5/18* (2013.01); *F02K 3/06* (2013.01); *F04D 29/324* (2013.01); *F04D 29/325* (2013.01); *F04D 29/388* (2013.01); *F05D 2220/36* (2013.01); *F05D 2240/301* (2013.01); *F05D 2250/131* (2013.01); *F05D 2250/18* (2013.01); *F05D 2250/38* (2013.01); *F05D 2260/941* (2013.01); *F05D 2260/96* (2013.01);
(Continued)

(58) Field of Classification Search
CPC ... F01D 5/147; F01D 5/18; F01D 5/16; F04D 29/388; F04D 29/325; F04D 29/324; F05D 2300/174; F05D 2300/173; F05D 2250/18; F05D 2250/131; F05D 2240/301; F05D 2220/36; F05D 2250/38; F05D 2260/96; F05D 2260/941; F02K 3/06

See application file for complete search history.

(56) References Cited

U.S. PATENT DOCUMENTS 5,253,824 A   10/1993   Halila et al.
5,419,040 A    5/1995   Ineisse et al.
(Continued)

FOREIGN PATENT DOCUMENTS

EP   0930419 A1 *  7/1999  ............. F01D 5/187
GB   1410014    * 12/1971  ............... F01D 5/18
Gb   2272731 A     5/1994

OTHER PUBLICATIONS

European Search Report for European Application No. 18182306.3 dated Nov. 16, 2018.

*Primary Examiner* — Hung Q Nguyen
(74) *Attorney, Agent, or Firm* — Carlson, Gaskey & Olds, P.C.

(57) ABSTRACT

A fan blade includes first and second portions that are secured to one another and provide a cavity. The first and second portions form an exterior airfoil surface that extends in a radial direction from a root to a tip and in a chord-wise direction from a leading edge to a trailing edge. Radial ribs extend in a radial direction from the root toward the tip and are spaced apart from one another in the chord-wise direction. First and second angled ribs intersect one another at a first apex. The radial ribs intersect at least one of the first and second angled ribs. The first and second angled ribs are at an angle relative to one of the radial ribs. The angle is in a range of 45°+/−30°.

18 Claims, 3 Drawing Sheets

(51) Int. Cl.
*F01D 5/16* (2006.01)
*F04D 29/32* (2006.01)
*F01D 5/18* (2006.01)
*F04D 29/38* (2006.01)

(52) U.S. Cl.
CPC .. *F05D 2300/173* (2013.01); *F05D 2300/174* (2013.01)

(56) References Cited

U.S. PATENT DOCUMENTS

| | | |
|---|---|---|
| 5,584,660 A | 12/1996 | Carter et al. |
| 5,634,771 A | 6/1997 | Howard et al. |
| 5,947,688 A * | 9/1999 | Schilling ................ F01D 5/147 416/233 |
| 6,033,186 A | 3/2000 | Schilling et al. |
| 6,481,972 B2 | 11/2002 | Wang et al. |
| 6,854,959 B2 | 2/2005 | Barb |
| 8,172,541 B2 | 5/2012 | Cairo |
| 9,091,175 B2 | 7/2015 | Durocher et al. |

\* cited by examiner

GAS TURBINE ENGINE HOLLOW FAN BLADE RIB ORIENTATION

BACKGROUND

This disclosure relates to hollow fan blades for use in gas turbine engines, for example. In particular, the disclosure relates to rib orientation within the fan blade and a process for determining the same.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Thrust is primarily provided by the fan section in high bypass gas turbine engines used in commercial applications. As such, the fan blade design is an important component in the engine's design as these blades are highly stressed. In order to reduce the weight of the engine, composite, aluminum alloy and titanium alloy fan blades have been used. Tuning solid fan blades typically involves modifying the thickness and chord length of the fan blade airfoil.

SUMMARY

In one exemplary embodiment, a fan blade includes first and second portions that are secured to one another and provide a cavity. The first and second portions form an exterior airfoil surface that extends in a radial direction from a root to a tip and in a chord-wise direction from a leading edge to a trailing edge. Radial ribs extend in a radial direction from the root toward the tip and are spaced apart from one another in the chord-wise direction. First and second angled ribs intersect one another at a first apex. The radial ribs intersect at least one of the first and second angled ribs. The first and second angled ribs are at an angle relative to one of the radial ribs. The angle is in a range of 45°+/−30°.

In a further embodiment of any of the above, the angle is in a range of 45°+/−15°.

In a further embodiment of any of the above, the angle is in a range of 45°+/−5°.

In a further embodiment of any of the above, the radial ribs are parallel to one another within 15°.

In a further embodiment of any of the above, the number of radial ribs is at least three.

In a further embodiment of any of the above, the radial ribs extend to at least a 50% span position.

In a further embodiment of any of the above, multiple first and second angled ribs are arranged in a waffle pattern and form multiple polygons each having first and second radial apexes and first and second lateral apexes. The second radial apex nearer the tip than the first radial apex. The first lateral apex nearer the leading edge than the second lateral apex.

In a further embodiment of any of the above, at least one of the radial ribs is joined at one of the first apexes.

In a further embodiment of any of the above, the waffle pattern is provided in a span region and extends from a 50% span position to a 100% span position.

In a further embodiment of any of the above, the waffle pattern extends to a tip wall at the 100% span position.

In a further embodiment of any of the above, at least one of the first and second portions provides leading and trailing edge walls that respectively provide the leading and trailing edges. The waffle pattern extends to at least one of the leading and trailing edge walls.

In a further embodiment of any of the above, at least one of the first and second portions provides leading and trailing edge walls that respectively provide the leading and trailing edges. At least one chord-wise rib extends from the waffle pattern to one of the leading and trailing edge walls.

In a further embodiment of any of the above, the first and second portions are one of a titanium alloy or an aluminum alloy.

In another exemplary embodiment, a method of designing a fan blade includes modeling a fan blade configuration with internal reinforcing ribs. Stresses are identified for various modes of the fan blade configuration. Common stress areas are identified between the various modes. An orientation of the internal reinforcing ribs is varied in the common stress areas to provide a revised fan blade configuration with increased separation between some of the various modes that generate the stresses compared to the modeled fan blade configuration.

In a further embodiment of any of the above, revised fan blade configuration includes first and second portions that are secured to one another and provide a cavity. The first and second portions form an exterior airfoil surface that extends in a radial direction from a root to a tip and in a chord-wise direction from a leading edge to a trailing edge. Radial ribs extend in a radial direction from the root toward the tip and are spaced apart from one another in the chord-wise direction. First and second angled ribs intersect one another at a first apex. The radial ribs intersect at least one of the first and second angled ribs. The first and second angled ribs at an angle relative to one of the radial ribs. The angle is in range of 45°+/−30°.

In a further embodiment of any of the above, the angle is in a range of 45°+/−15°.

In a further embodiment of any of the above, the angle is in a range of 45°+/−5°.

In a further embodiment of any of the above, multiple first and second angled ribs are arranged in a waffle pattern and form multiple polygons each having first and second radial apexes and first and second lateral apexes. The second radial apex nearer the tip than the first radial apex. The first lateral apex nearer the leading edge than the second lateral apex.

In a further embodiment of any of the above, the waffle pattern is provided in a span region and extends from a 50% span position to a 100% span position.

In a further embodiment of any of the above, at least one of the first and second portions provides leading and trailing edge walls that respectively provide the leading and trailing edges. At least one chord-wise rib that extends from the waffle pattern to one of the leading and trailing edge walls.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
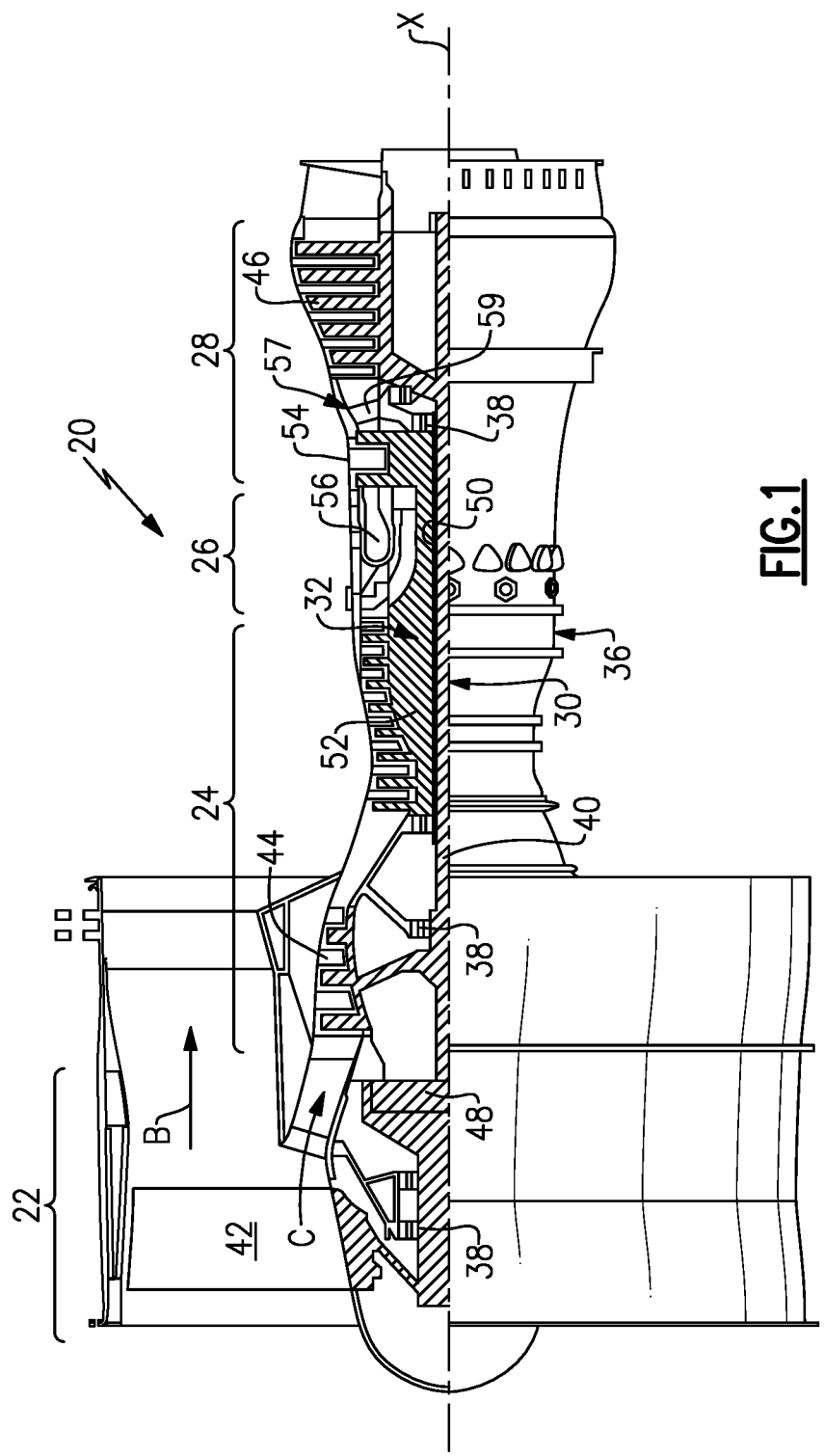
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
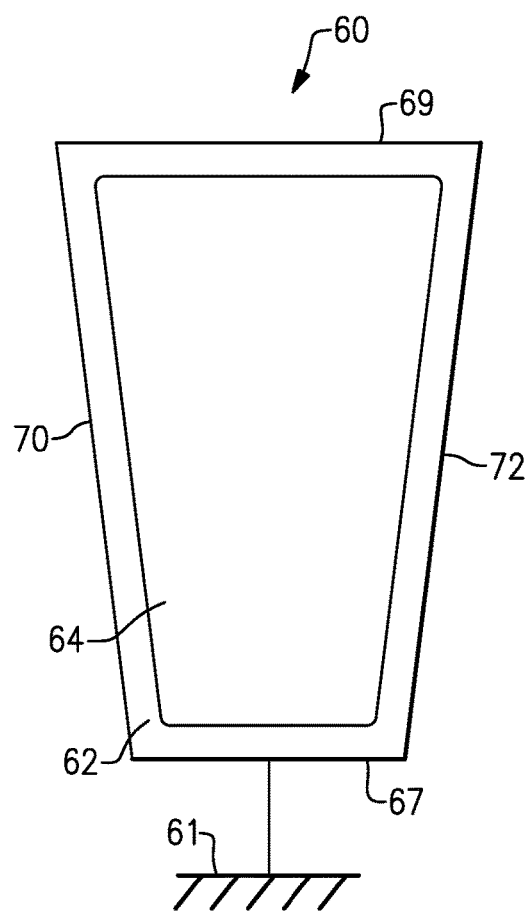
FIG. 2 is a schematic view of an example fan blade.

An example fan blade 60 is shown in FIG. 2. The fan blade 60 includes first and second portions 62, 64 secured to one another, for example, using brazing or other attachment methods. The fan blade 60 may be constructed from an aluminum alloy, a titanium alloy or other suitable materials.

Figure 4:
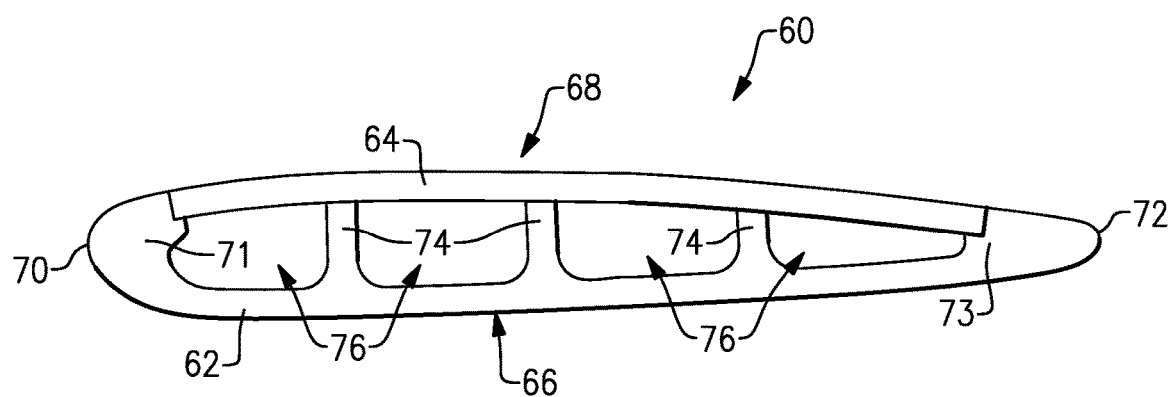
FIG. 4 a cross-sectional view through FIG. 3 at line 4-4.

Fan blade 60 extends radially in a span direction from a root 67, which is supported by a hub 61, to a tip 69. Referring to FIG. 4, the fan blade 60 has an exterior airfoil surface provided by pressure and suction sides 66, 68 joined to one another at leading and trailing edges 70, 72, which are respectively provided by leading and trailing edge walls 71, 73.

Figure 3:
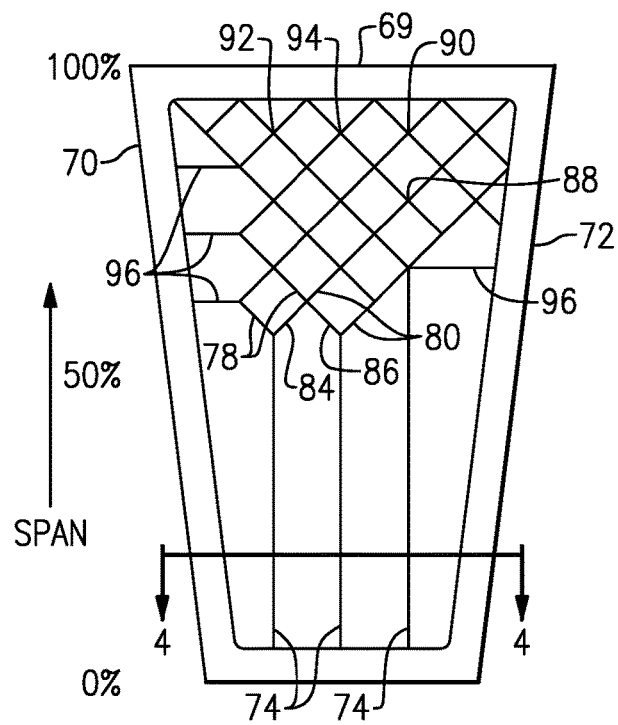
FIG. 3 is a schematic view of the fan blade shown in FIG. 2 with a portion removed to reveal an example reinforcing rib configuration.

The first and second portions 62, 64 provide a hollow structure with various reinforcing ribs that provide open, unfilled cavities 76 in the example. Referring to FIGS. 3 and 4, radial ribs 74, for example, at least three, extend in the span direction from a location near the root at a 0% span position to at least the 50% span position. The radial ribs 74, which are generally parallel with one another (e.g., within 15°) support radial loading and maintain first bending mode stiffness. Other rib orientations may be desirable.

Tuning of an airfoil usually requires modification of thickness and chord length distributions. A hollow fan blade offers additional tuning design variables such as wall and rib thickness. Each of these variables is utilized when tuning the first few modes of a commercial fan blade. Frequently, two of these modes have resonances occurring at nearly the same mechanical speed at a common stress area. As such their resonant stress can add together challenging and even reducing the high cycle fatigue life. Another design variable is needed to separate these resonances such that fatigue requirements can be satisfied.

To this end, angled ribs are used from about a 50% span position to at or near the 100% span position at the tip 69. In one example, the angled ribs may begin further up the airfoil, for example, 66% span position; however, it should be understood that the angled ribs may be used at other locations. The angled ribs include first and second angled ribs 78, 80 that intersect one another at intersections 82. The first and second angled ribs are positioned at about a 90° angle with respect to one another in the example, with the first and second angled ribs 78, 80 angled in range of greater than 0° and less than 90° relative to one of the radial ribs 74. In one example the angle is in a range of 45°+/−30° relative to one of the radial ribs 74. In another example, the angle is in a range of 45°+/−15° relative to one of the radial ribs 74, and in yet another example, the angle is in a range of 45°+/−5° relative to one of the radial ribs 74.

The first and second angled ribs 78, 80 intersect on another at intersections 82, which separate the first angled ribs 78 into first legs 84 and the second angled ribs 80 into second legs 86. In the example shown, the first and second angled ribs 78, 80 are arranged in a waffle-like pattern providing adjoining polygonal shapes, which extend to a tip wall providing the tip 69 in the example. In the example, the waffle pattern extends to at least one of the leading and trailing edge walls 71, 73.

For a given polygon, the first and second legs 84, 86 provide first and second radial apexes 88, 90 with the first radial apex radially inwardly positioned of the second radial apex 90. That is, the second radial apex 90 is nearer the tip 69 than the first radial apex 88. For the same given polygon, the first and second legs 84, 86 also form first and second lateral apexes 92, 94 spaced apart from one another in a chord-wise direction, such that the first lateral apex 92 is nearer the leading edge 70 than the second lateral apex 94. In the example rib configuration, at least one of the radial ribs 74 is joined at one of the first apexes 88. The layout of first and second angled ribs 78, 80 and their angles with respect to one another and the radial direction enable mode separation between modes having resonances occurring at nearly same mechanical speed at a common stress area.

Chord-wise ribs 96 may be used in a chord-wise direction to improve bird impact performance. These chord-wise ribs 96 extend from the first and second angled ribs 78, 80 to the leading and/or trailing edges 70, 72.

Figure 5:
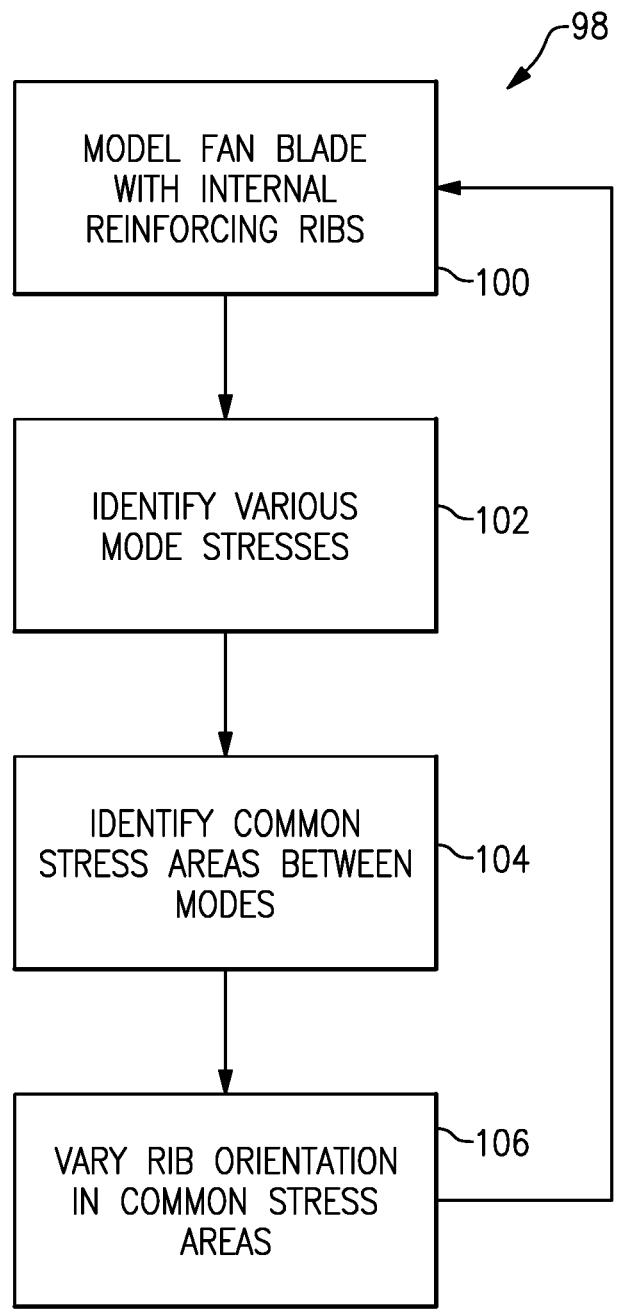
FIG. 5 is a flowchart depicting an example design method for the fan blade.

An example fan blade design method is illustrated in FIG. 5. The method 98 includes modeling a fan blade configuration with internal reinforcing ribs, as indicated at block 100. A simulation is performed on the modeled fan blade to identify stresses for various modes, for example, first bending and torsion modes and second bending and torsion modes, as indicated at block 102. Once a simulation has been performed, common stress areas between the various modes are identified, as indicated at block 104, to locate areas of the fan blade in need of mode shape adjustment without adding mass, which can provide some separation between resonances. The ribs can be oriented differently to impact torsional and bending stiffness in a different manner. In one example, an approximately 45° orientation of each of the first and second angled ribs 78, 80 with respect to the radial ribs 74 in the span direction provides additional separation between the first torsion mode and the second bending mode. With the rib orientation varied in the common stress areas, as indicated at block 106, the next iteration of the fan blade design process may occur, if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A fan blade comprising:
   first and second portions secured to one another and providing a cavity, the first and second portions forming an exterior airfoil surface extending in a radial direction from a root to a tip and in a chord-wise direction from a leading edge to a trailing edge, radial ribs extending in a radial direction from the root toward the tip and spaced apart from one another in the chord-wise direction, first and second angled ribs intersecting one another at a first apex, the radial ribs intersecting at least one of the first and second angled ribs, the first and second angled ribs at an angle relative to one of the radial ribs, the angle is in range of 45°+/−15°.

2. The fan blade of claim 1, wherein the angle is in a range of 45°+/−5°.

3. A fan blade comprising:
   first and second portions secured to one another and providing a cavity, the first and second portions forming an exterior airfoil surface extending in a radial direction from a root to a tip and in a chord-wise direction from a leading edge to a trailing edge, radial ribs extending in a radial direction from the root toward the tip and spaced apart from one another in the chord-wise direction, first and second angled ribs intersecting one another at a first apex, the radial ribs intersecting at least one of the first and second angled ribs, the first and second angled ribs at an angle relative to one of the radial ribs, the angle is in range of 45°+/−30°, wherein multiple first and second angled ribs are arranged in a waffle pattern forming multiple polygons each having first and second radial apexes and first and second lateral apexes, the second radial apex nearer the tip than the first radial apex, and the first lateral apex nearer the leading edge than the second lateral apex.

4. The fan blade of claim 3, wherein the radial ribs are parallel to one another within 15°.

5. The fan blade of claim 4, wherein the number of radial ribs is at least three.

6. The fan blade of claim 4, wherein the radial ribs extend to at least a 50% span position.

7. The fan blade of claim 3, wherein at least one of the radial ribs is joined at one of the first apexes.

8. The fan blade of claim 3, wherein the waffle pattern is provided in a span region extending from a 50% span position to a 100% span position.

9. The fan blade of claim 3, wherein the waffle pattern extends to a tip wall at the 100% span position.

10. The fan blade of claim 9, wherein at least one of the first and second portions provides leading and trailing edge walls that respectively provide the leading and trailing edges, the waffle pattern extends to at least one of the leading and trailing edge walls.

11. The fan blade of claim 3, wherein at least one of the first and second portions provides leading and trailing edge walls that respectively provide the leading and trailing edges, comprising at least one chord-wise rib that extends from the waffle pattern to one of the leading and trailing edge walls.

12. The fan blade of claim 3, wherein the first and second portions are one of a titanium alloy or an aluminum alloy.

13. A method of designing a fan blade, comprising:
modeling a fan blade configuration with internal reinforcing ribs;
identifying stresses for various modes of the fan blade configuration;
identifying common stress areas between the various modes; and
varying an orientation of the internal reinforcing ribs in the common stress areas to provide a revised fan blade configuration with increased separation between some of the various modes that generate the stresses compared to the modeled fan blade configuration, wherein multiple first and second angled ribs are arranged in a waffle pattern forming multiple polygons each having first and second radial apexes and first and second lateral apexes, the second radial apex nearer the tip than the first radial apex, and the first lateral apex nearer the leading edge than the second lateral apex.

14. The method of claim 13, wherein the revised fan blade configuration includes first and second portions secured to one another and providing a cavity, the first and second portions forming an exterior airfoil surface extending in a radial direction from a root to a tip and in a chord-wise direction from a leading edge to a trailing edge, radial ribs extending in a radial direction from the root toward the tip and spaced apart from one another in the chord-wise direction, first and second angled ribs intersecting one another at a first apex, the radial ribs intersecting at least one of the first and second angled ribs, the first and second angled ribs at an angle relative to one of the radial ribs, the angle is in range of 45°+/−30°.

15. The method of claim 14, wherein the angle is in a range of 45°+/−15°.

16. The method of claim 15, wherein the angle is in a range of 45°+/−5°.

17. The method of claim 14, wherein the waffle pattern is provided in a span region extending from a 50% span position to a 100% span position.

18. The method of claim 14, wherein at least one of the first and second portions provides leading and trailing edge walls that respectively provide the leading and trailing edges, comprising at least one chord-wise rib that extends from the waffle pattern to one of the leading and trailing edge walls.

* * * * *